United States Patent
Lei et al.

(10) Patent No.: US 11,460,376 B2
(45) Date of Patent: Oct. 4, 2022

(54) VEHICLE SCRATCH DETECTION SYSTEM AND VEHICLE

(71) Applicant: Bayerische Motoren Werke Aktiengesellschaft, Munich (DE)

(72) Inventors: Wenhui Lei, Shanghai (CN); Rick Li, Suzhou (CN)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 404 days.

(21) Appl. No.: 16/713,095

(22) Filed: Dec. 13, 2019

(65) Prior Publication Data

US 2020/0116593 A1  Apr. 16, 2020

Related U.S. Application Data

(63) Continuation of application No. PCT/CN2017/093029, filed on Jul. 14, 2017.

(51) Int. Cl.
| | | |
|---|---|---|
| *G01M 17/00* | (2006.01) | |
| *B60R 13/04* | (2006.01) | |
| *G01N 27/61* | (2006.01) | |
| *G07C 5/00* | (2006.01) | |
| *H04N 5/232* | (2006.01) | |

(52) U.S. Cl.
CPC ............. *G01M 17/00* (2013.01); *B60R 13/04* (2013.01); *G01N 27/61* (2013.01); *G07C 5/008* (2013.01); *H04N 5/23206* (2013.01)

(58) Field of Classification Search
CPC .... G01M 17/00; B60R 13/04; B60R 16/0234; G01N 27/61; G07C 5/008; G07C 5/00; H04N 5/23206

See application file for complete search history.

(56) References Cited

U.S. PATENT DOCUMENTS

| | | | | |
|---|---|---|---|---|
| 6,150,927 A | * | 11/2000 | Nesbitt ................. | G08B 13/04 340/426.25 |
| 7,385,515 B1 | * | 6/2008 | Owen ................... | G08B 13/196 340/539.11 |
| 10,837,932 B2 | * | 11/2020 | Park ...................... | G01N 27/20 |

(Continued)

FOREIGN PATENT DOCUMENTS

| | | |
|---|---|---|
| CN | 103158646 A | 6/2013 |
| CN | 103802758 A | 5/2014 |

(Continued)

OTHER PUBLICATIONS

International Search Report (PCT/ISA/210) issued in PCT Application No. PCT/CN2017/093029 dated Apr. 17, 2018 (two (2) pages).

(Continued)

*Primary Examiner* — Yonel Beaulieu
(74) *Attorney, Agent, or Firm* — Crowell & Moring LLP

(57) ABSTRACT

A vehicle scratch detection system includes a scratch detection element, disposed on a vehicle body and capable of detecting a scratch of the vehicle body, a control unit, configured to be capable of analyzing and processing detection information of the scratch detection element and determining information related to scratch, and an alarm device. The control unit is capable of triggering the alarm device to send an alarm signal according to a result of the analyzing and processing.

13 Claims, 2 Drawing Sheets

(56) References Cited

U.S. PATENT DOCUMENTS

| | | | |
|---|---|---|---|
| 2008/0316312 A1 | 12/2008 | Castillo et al. | |
| 2013/0061679 A1* | 3/2013 | Steckel | H03K 17/94 |
| | | | 73/632 |
| 2013/0183523 A1* | 7/2013 | Kase | C09J 123/0869 |
| | | | 428/355 EN |
| 2015/0304649 A1 | 10/2015 | Hoffmann et al. | |
| 2018/0227548 A1 | 8/2018 | Gusikhin et al. | |
| 2019/0257794 A1* | 8/2019 | McGovern | G01N 29/043 |
| 2019/0375359 A1* | 12/2019 | Muhammad | G01L 1/16 |
| 2020/0031301 A1* | 1/2020 | Suzuki | B60W 40/06 |
| 2021/0174117 A1* | 6/2021 | Hever | H04N 5/23229 |
| 2022/0044023 A1* | 2/2022 | Xue | G06V 20/64 |

FOREIGN PATENT DOCUMENTS

| | | |
|---|---|---|
| CN | 103802787 A | 5/2014 |
| CN | 106864181 A | 6/2017 |
| DE | 10 2006 012 336 A1 | 11/2006 |
| DE | 10 2008 018 671 A1 | 10/2009 |
| GB | 2527781 A | 1/2016 |
| WO | WO 02/34583 A1 | 5/2002 |

OTHER PUBLICATIONS

Written Opinion (PCT/ISA/237) issued in PCT Application No. PCT/CN2017/093029 dated Apr. 17, 2018 (three (3) pages).
Extended European Search Report issued in European Application No. 17917691.2 dated Feb. 3, 2021 (six (6) pages).

* cited by examiner

VEHICLE SCRATCH DETECTION SYSTEM AND VEHICLE

CROSS REFERENCE TO RELATED APPLICATION

This application is a continuation of PCT International Application No. PCT/CN2017/093029, filed Jul. 14, 2017, the entire disclosure of which is herein expressly incorporated by reference.

BACKGROUND AND SUMMARY OF THE INVENTION

The present invention relates to a vehicle scratch detection system and a vehicle.

Over the past decade, China has quickly stepped into the automotive era, for example the amount of private cars expanded from 58.11 million in 2011 to 124.35 million by the end of 2015. For instance, for Shanghai, there were 2.47 million vehicles in 2015, while the area of Shanghai is only 6,340 square kilometers. This gave rise to a series of serious problems: heavy traffic pressure, tight parking spaces, and scratches upon parking in the community or even collision damage.

Since the urban area was planned mostly 30 years ago, there are not enough parking spaces within the old communities; within the new community, there is usually one parking space for one householder, but nowadays, for example, more and more families in Shanghai have two or more cars, so that the parking spaces are still tight. Even if it is lucky enough to find a parking space, there is still a potential risk of damage to the vehicle. For example, the distance between cars is too close in the parking lot, and the parking takes up part of the sidewalk, thus leaving very limited space for pedestrians and bicycles. Thus, it is difficult to avoid scratch or collision damage caused by other vehicles or pedestrians (even if unintentionally). For example, by scratch is meant the scratching damage occurring on the outer surface of the vehicle body resulting from the car body being in frictional contact with other objects (people or objects). In daily life, serious collision only occupies a small proportion, while a major proportion of accidents are such very small scratches and such small scratches cannot be noticed by the driver in the first time. The driver or the car owner cannot even know when, where, and how they happened. Thereby, there is no way to ascertain the causes and investigate the responsibilities as well.

At present, in order to avoid these accidents, it is a normal deed to adopt the following countermeasures:

install a lot of cameras around the parking lot or at every corner of the communities;

hire security personnel to monitor the parking lot or communities;

the vehicle itself is equipped with a collision warning system so that the collusion sensor will detect and automatically start the collision warning system when the vehicle is hit by a great external force.

However, for the first two measures, the driver or car owner cannot predict the risk; a scratch is prevented only by naked eye or evidence provided to a driver or car owner when a scratch is noticed. Since such scratch is very small, the security, the driver or the car owner generally does not notice such a small scratch, and moreover, the expenses may be increased by hiring security personnel. For the third measure, the collision warning system will work and automatically send an alert only when a serious collision occurs in the vehicle, and such a small scratch cannot trigger an existing collision warning system at all, so that the collision alarm system will not be able to provide an image record or notify the driver or car owner immediately.

In order to overcome the aforementioned problems, the present invention provides a vehicle scratch detection system and a vehicle comprising the vehicle scratch detection system, such as to monitor scratch of the vehicle instantaneously and reliably by utilizing the vehicle scratch detection system.

On one hand, the aforementioned object is achieved by a vehicle scratch detection system having the following features, i.e., the vehicle scratch detection system according to the present invention comprises: a scratch detection element, disposed on a vehicle body and capable of detecting a scratch of the vehicle body; a control unit, configured to be capable of analyzing and processing detection information of the scratch detection element and determining information related to scratch; and an alarm device, the control unit being capable of triggering the alarm device to send an alarm signal according to a result of the aforementioned analyzing and processing. Compared with manual monitoring, the vehicle scratch detection system according to the present invention can reduce the labor cost and raise the accuracy. Compared with the method of detecting collision by a collision acceleration of the vehicle collision system, the vehicle scratch detection device according to the present invention significantly improves the sensitivity of the system in response, and is capable of detecting a minute scratch that cannot trigger the collision alarm system, without being affected by vehicle bumps such as to give rise to false alarms.

According to a preferred embodiment, the information related to scratch comprises: whether a scratch occurs, a scratch position, a scratch strength and/or a scratch area.

According to a preferred embodiment, the vehicle scratch detection system further comprises a camera, the control unit being configured to be capable of triggering a corresponding camera according to the information related to scratch, so as to record a corresponding real-time scratch scene. As a result, it is possible to record how a scratch happens by the camera, providing reliable evidence for investigating responsibilities for an accident. When necessary, the scene taken by the camera can also be sent immediately directly to a driver within the vehicle or transmitted to a remote driver or car owner not within the vehicle in a wireless transmission manner such as mobile network, WiFi, Bluetooth and the like. In this way, the driver or the car owner can know the relevant situation immediately.

According to a preferred embodiment, the vehicle scratch detection system further comprises a storage device, wherein the information related to scratch, a result of the analyzing and processing and/or the recorded real-time scratch scene, can be stored in the storage device. Such information is stored in the storage device to facilitate analysis of the causes of the accident, definition of the responsibilities as well as forensic investigation.

According to a preferred embodiment, the scratch detection element is a scratch detection film. Preferably, the scratch detection film is applied to a lower portion of four sides of the vehicle body. More preferably, the scratch detection film is applied to front and rear fenders of the vehicle, exterior trim panels of vehicle doors, a side of a trunk lid and/or exterior trim panels of front and rear bumpers. Further preferably, the scratch detection film is a pressure-sensitive film or a piezoelectric film, such that when the pressure-sensitive film or piezoelectric film that is energized by being subjected to an external force so as to be deformed, a current thereof varies, and a current variation signal can be transmitted to the control unit. Still further preferably, the scratch detection film is applied to the vehicle body when the vehicle body is manufactured or can be installed or modified afterwards. The scratch detection film is of simple technology, easy to implement and presents high reliability and accuracy. The application of the scratch detection film whilst manufacturing the vehicle body facilitates mass production, reduces the cost, and presents a high degree of customization; while the installation or modification of the scratch detection film afterwards is capable of satisfying individual needs of users, and providing private customized services. The piezoelectric film, which presents low cost, light weight, high sensitivity, high mechanical strength, reliable, durable and supple properties, can match a contour of the vehicle body very well.

According to a preferred embodiment, the alarm signal is an audible signal, a visual signal, or other sensible signals. Preferably, the alarm signal can be transferred to the driver or passenger within an automobile through a human-machine interface such as sound, light and image and the like, or can be transmitted to a cloud server or a remotely related person in a wireless transmission manner such as mobile network, WiFi, Bluetooth and the like. As a result, the driver within the vehicle or remotely related personnel can grasp a scratch condition of the vehicle as it occurs and timely handle the accident.

On the other hand, the object of the present invention is realized by a vehicle comprising the vehicle scratch detection system according to the present invention.

Other objects, advantages and novel features of the present invention will become apparent from the following detailed description of one or more preferred embodiments when considered in conjunction with the accompanying drawings.

DETAILED DESCRIPTION OF THE DRAWINGS

The concrete embodiments of the present disclosure are described herein with reference to the drawings; however, it should be understood that the disclosed embodiments are merely examples of the present disclosure and may be carried out in multiple manners. The specific structural and functional details disclosed herein are not intended for definition, but are merely used to teach a person skilled in the art to diversely use the present disclosure in a substantively random and proper detailed structure. The same reference signs may refer to similar or identical elements throughout the description of the drawings.

In the present invention, the control unit 10 may include any type of computing device, a calculation circuit or any type of processor or a processing circuit capable of executing a series of instructions stored in the memory. The control unit may comprise a plurality of processors and/or a multi-core central processing unit (CPU) and may comprise any type of processor, such as a microprocessor, a digital signal processor, a microcontroller, and the like. The control unit may further comprise a memory to store data and/or program codes to execute a series of instructions.

Any method and procedure described in the present application may be converted or expressed as a programming language or a computer program. "Programming Language" and "Computer Program" are any language used to assign instructions to a computer and include (but are not limited to) these languages and their derivatives: Assembly Language, Basic, Batch File, BCPL, C, C+, C++, Delphi, Fortran, Java, JavaScript, machine code, Operating System Command Language, Pascal, Perl, PL1, scripting language, Visual Basic, its own specified program meta-language, as well as the first generation, second generation, third generation, fourth generation and fifth generation of computer languages. There also include databases and other data patterns, as well as any other source language.

Any method or procedure described in the present application may be contained on one or more computer-readable storage media. The term "memory" or "storage device" may include a mechanism providing information in a format readable by, for example, a processor, a computer, or a digital processing device. For instance, a memory or storage device may include a read-only memory (ROM), a random access memory (RAM), a disk storage medium, an optical storage medium, a flash memory device, or any other volatile or nonvolatile storage device.

Hereinafter, specific embodiments of the present invention will be described in detail in combination with the drawings.

Figure 1:
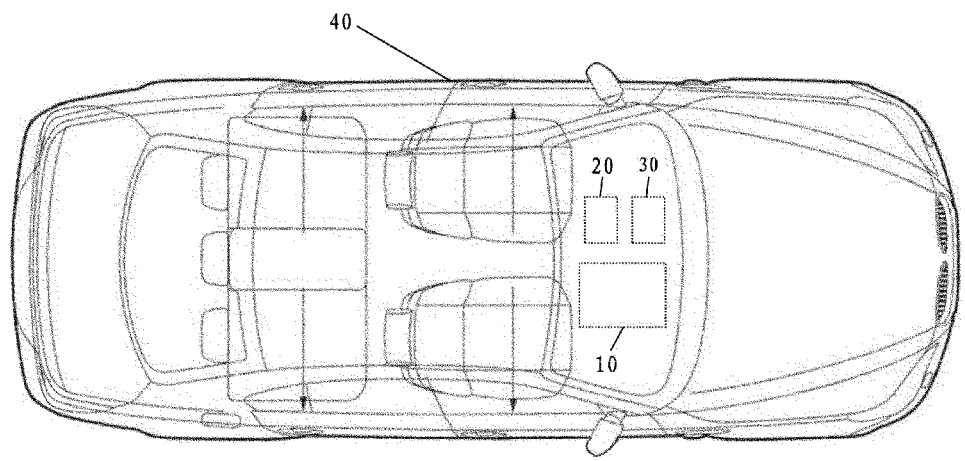
FIG. 1 is a schematic view of a vehicle having the vehicle scratch detection system according to an embodiment of the present invention.

FIG. 1 shows a schematic view of a vehicle 1 equipped with the vehicle scratch detection system.

Figure 2:
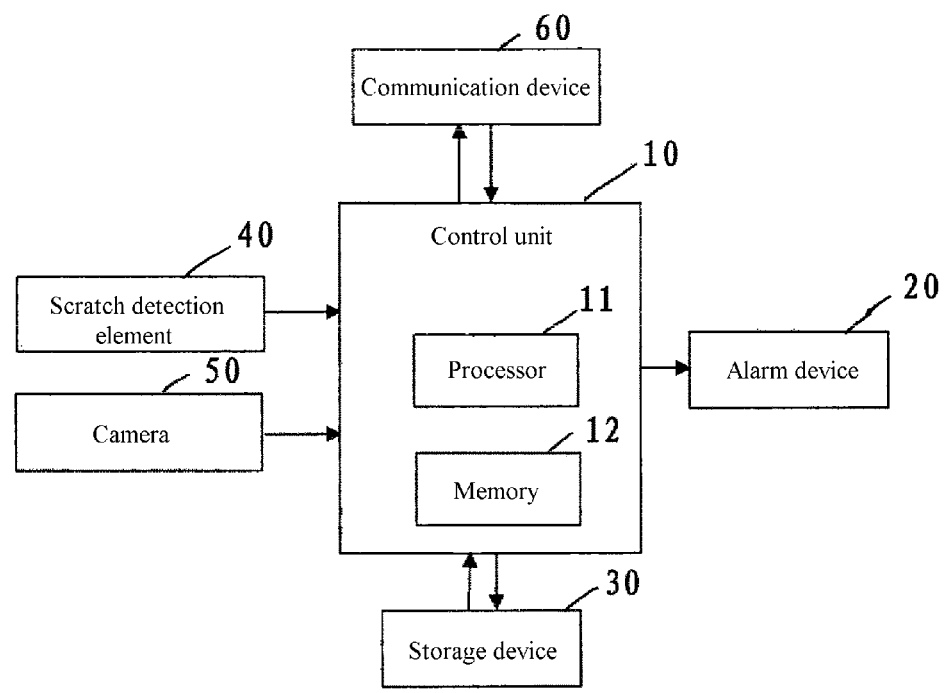
FIG. 2 is a system block diagram of a preferred embodiment of the vehicle scratch detection system according to the present invention.

FIG. 2 schematically shows a system block diagram of a preferred embodiment of the vehicle scratch detection system according to the present invention. In the preferred embodiment, the vehicle scratch detection system may include a control unit (ECU) 10, an alarm device 20, a storage device 30, a scratch detection element 40, a camera 50, and a communication device 60.

The control unit 10 includes a processor 11 and a memory 12. The control device 10 may be a central controller of an automobile, or a separate controller dedicated to the vehicle scratch detection system. The control unit 10 may be connected to the alarm device 20, the storage device 30, the scratch detection element 40, the camera 50, and the communication device 60 in a wired manner or a wireless manner. The control unit 10 can be started or turned off by a driver of the vehicle.

The alarm device 20 may send a plurality of different signals. In particular, the alarm device may receive an instruction from the control unit 10 and send out a signal in accordance with the instruction of the control unit 10. The signal may be an audible signal, a visual signal, or other sensible signals. For example, the alarm signal may be transferred to a driver or passenger within an automobile through a human-machine interface such as sound, light and image and the like, or may be transmitted to a cloud server or a remotely related person (a driver or car owner) in a wireless transmission manner such as mobile network, WiFi, Bluetooth and the like.

The storage device 30 is an external storage device connected to the control unit 10 to facilitate data storage.

The processor of the control unit 10 may also directly read the data and/or programs of the external storage device, which facilitates the extension of system functions. The information related to a scratch condition received by the control unit 10 as well as the analyzing and processing result may be stored in the storage device 30.

The scratch detection element 40 for example may be a scratch detection film. The scratch detection film is of simple technology, easy to implement and presents high accuracy. Preferably, a pressure-sensitive film or a piezoelectric film may be used. The application of an action force (such as pressing) on the energized pressure-sensitive film or piezoelectric film may render deformation of the film, thereby causing a variation in the energized current. By detecting a variation in the input current in different directions, the horizontal and vertical coordinates of the pressing position may be obtained to achieve the purpose of detecting a pressing position and magnitude.

Figure 3:
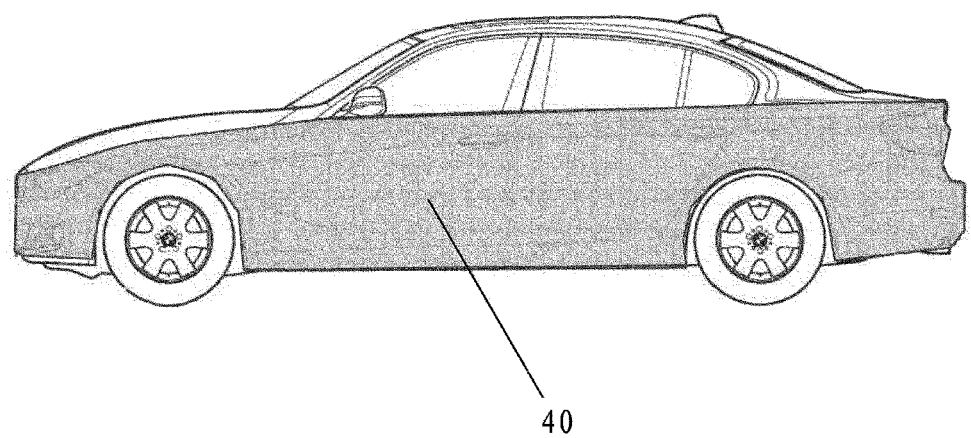
FIG. 3 is a side view of a distribution condition of a scratch detection element of the vehicle scratch detection system according to the present invention on a vehicle body.

In the present embodiment, the pressure-sensitive film or the piezoelectric film is applied to a lower portion of four sides of the vehicle body, for example, front and rear fenders, exterior trim panels of vehicle doors, exterior trim panels of front and rear bumpers or a side of a trunk lid. FIG. 3 schematically shows a schematic view of the scratch detection element 40 on the vehicle body. The pressure-sensitive film or the piezoelectric film may be provided substantially continuously around the vehicle body as shown in FIG. 3. However, it is also possible that a plurality of separate pressure-sensitive films or piezoelectric films are provided on a plurality of separate faces on the vehicle body.

The scratch detection film can be applied, for example adhered, when the vehicle body is manufactured, which facilitates mass production of the industry; and may also be installed or modified afterwards according to the needs of a user. When there is an external force applied to the pressure-sensitive film or the piezoelectric film or even the pressure-sensitive film or the piezoelectric film is damaged, the energized current thereof varies so that the scratch detection element 40 can transmit a current variation signal to the control unit 10, which after analysis and processing judges whether a scratch occurs, as well as information such as a scratch position, strength and area.

The camera 50 may be a camera of existing electronics of an automobile, such as a reversing assistance system, a camera of a lane-keeping assistance system; or may be a separate camera dedicated to the vehicle scratch detection system, for example, the separate camera may be provided on the inside of front and rear windshields, on a handle of the vehicle door handle as well as a rearview mirror of the automobile. The camera 50 is configured such that, when the scratch detection element detects a vehicle scratch, the control unit 10 immediately starts the camera to record the sound and image information of the scene around a corresponding scratch position and the camera transmits the sound and image information to the control unit 10 to perform the analysis, processing and storage, so as to directly provide the same to the driver or provide evidence afterwards. Or alternatively, the camera 50 is configured such that the camera uninterruptedly records information of the surrounding scene, and when the scratch detection element detects a vehicle scratch, the control unit 10 immediately stores the information of the scene around a corresponding scratch position within a time interval before and after the scratch's occurring.

The communication device 60 is designed to enable communication with a vehicle bus, or remotely related personnel, such as a driver or car owner who is not within or near the vehicle, using a communication network. For example, the communication device 60 may send information such as a vehicle scratch location, a scratch area, and a perpetrator to the vehicle bus or the driver (or the car owner). The communication device 60 is also capable of bi-directional communication with a cloud server.

Figure 4:
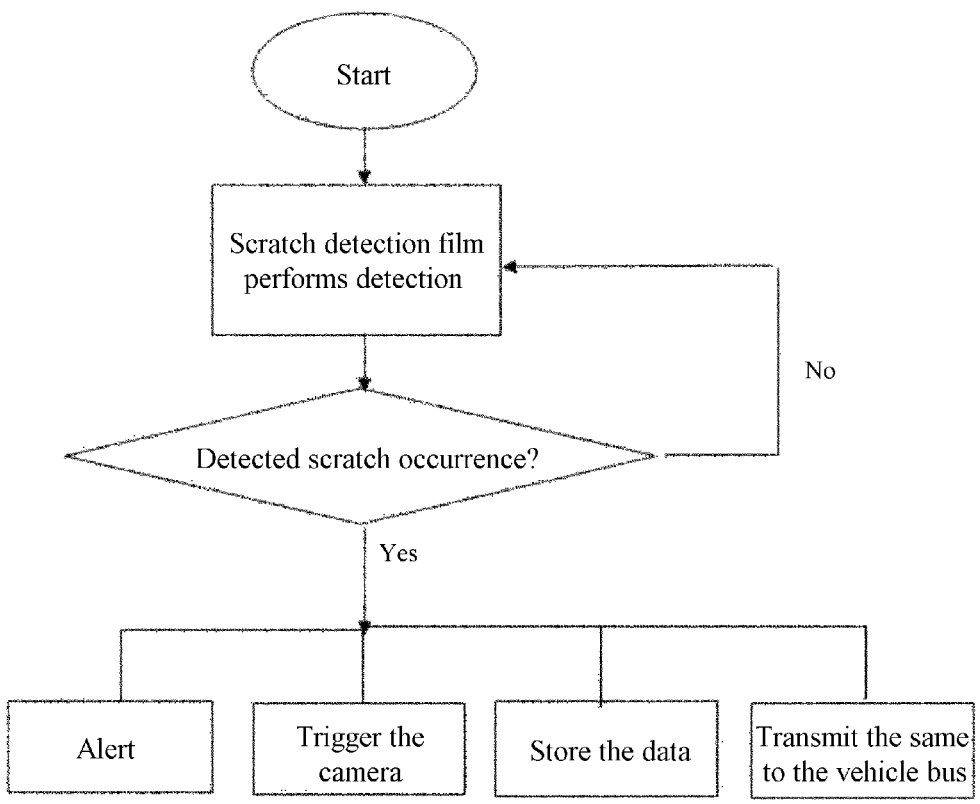
FIG. 4 is an exemplary operational flow diagram of the vehicle scratch detection system according to the present invention.

Next, by means of the flow diagram of FIG. 4, explanations will be made to how the vehicle equipped with the vehicle scratch detection system according to the present invention operates.

After the vehicle scratch detection system is started, there enters a scratch detection mode.

When the scratch detection film 40, for example a pressure-sensitive film or a piezoelectric film applied to four sides of the vehicle body, is subjected to an external force so as to be deformed or even damaged, the current thereof varies and a current variation signal is transmitted to the control unit 10.

The control unit 10 analyzes and processes the signal to judge whether a scratch occurs and determine information related to a scratch position, strength and area and so on. In the event of a scratch, the control unit 10 triggers the alarm device 20, which sends an audible signal, a visual signal, or other sensible signals to notify the relevant personnel. At the same time, the control unit 10 triggers a corresponding camera 50 to record the audio and video information in the vicinity of a corresponding scraping position, for example, in what manner who (what object) has scratched the vehicle. In this process, the control unit 10 stores in the storage device 30 such audio and video information together with the aforementioned information related to a scratch position, strength, area, and the like, so as to perform forensic investigation. If necessary, the control unit 10 may send the information recorded by the camera 50 to the relevant personnel. The control unit 10 may also send the aforementioned information to a vehicle bus for use by other electronics of the vehicle.

A person skilled in the art should understand that, he can make various modifications and variations to the above-disclosed various embodiments without departing from the essence of the invention, such modifications and variations should fall into the protection scope of the present invention, and the protection scope of the present invention should be defined by the claims. The technical features disclosed in the description, claims and drawings can be combined with each other at random, so long as the combination is technically feasible.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle scratch detection system, comprising:
   a scratch detection film disposed on a vehicle body and capable of detecting a scratch of the vehicle body;
   a control unit configured to be capable of analyzing and processing detection information of the scratch detection film and determining information related to a scratch; and
   an alarm device, wherein
   the control unit is capable of triggering the alarm device to send an alarm signal according to a result of the analyzing and processing of the detection information.

2. The vehicle scratch detection system according to claim 1, wherein
the information related to the scratch comprises: whether a scratch occurs, a scratch position, a scratch strength and/or a scratch area.

3. The vehicle scratch detection system according to claim 1, further comprising:
a camera, wherein
the control unit is configured to be capable of triggering the camera according to said information related to the scratch so as to record a corresponding real-time scratch scene.

4. The vehicle scratch detection system according to claim 3, further comprising
a storage device, wherein
the information related to the scratch, a result of said analyzing and processing and/or the recorded real-time scratch scene, is stored in the storage device.

5. The vehicle scratch detection system according to claim 1, wherein
the scratch detection film is applied to a lower portion of four sides of the vehicle body.

6. The vehicle scratch detection system according to claim 1, wherein
the scratch detection film is applied to front and rear fenders of the vehicle, exterior trim panels of vehicle doors, a side of a trunk lid and/or exterior trim panels of front and rear bumpers.

7. The vehicle scratch detection system according to claim 1, wherein
the scratch detection film is a pressure-sensitive film or a piezoelectric film, such that when the pressure-sensitive film or piezoelectric film, which is energized, is subjected to an external force so as to be deformed, a current thereof varies, and a current variation signal is transmitted to the control unit.

8. The vehicle scratch detection system according to claim 1, wherein
the scratch detection film is applied to the vehicle body when the vehicle body is manufactured or is installed or modified afterwards.

9. The vehicle scratch detection system according to claim 1, wherein
the alarm signal is transferred to a driver or passenger within an automobile through a human-machine interface or is transmitted to a cloud server or a remotely related person in a wireless transmission manner.

10. The vehicle scratch detection system according to claim 9, wherein
the human-machine interface is a sound, light, or image interface, and
the wireless transmission is carried out via a mobile network, WiFi, or Bluetooth.

11. The vehicle scratch detection system according to claim 2, wherein
the alarm signal is transferred to a driver or passenger within an automobile through a human-machine interface or is transmitted to a cloud server or a remotely related person in a wireless transmission manner.

12. The vehicle scratch detection system according to claim 3, wherein
the alarm signal is transferred to a driver or passenger within an automobile through a human-machine interface or is transmitted to a cloud server or a remotely related person in a wireless transmission manner.

13. A vehicle comprising a vehicle scratch detection system according to claim 1.

* * * * *